April 7, 1936.  G. GOEBEL  2,036,751
APPARATUS AND METHOD FOR FORMING CAPS
Filed Feb. 7, 1933  3 Sheets-Sheet 1
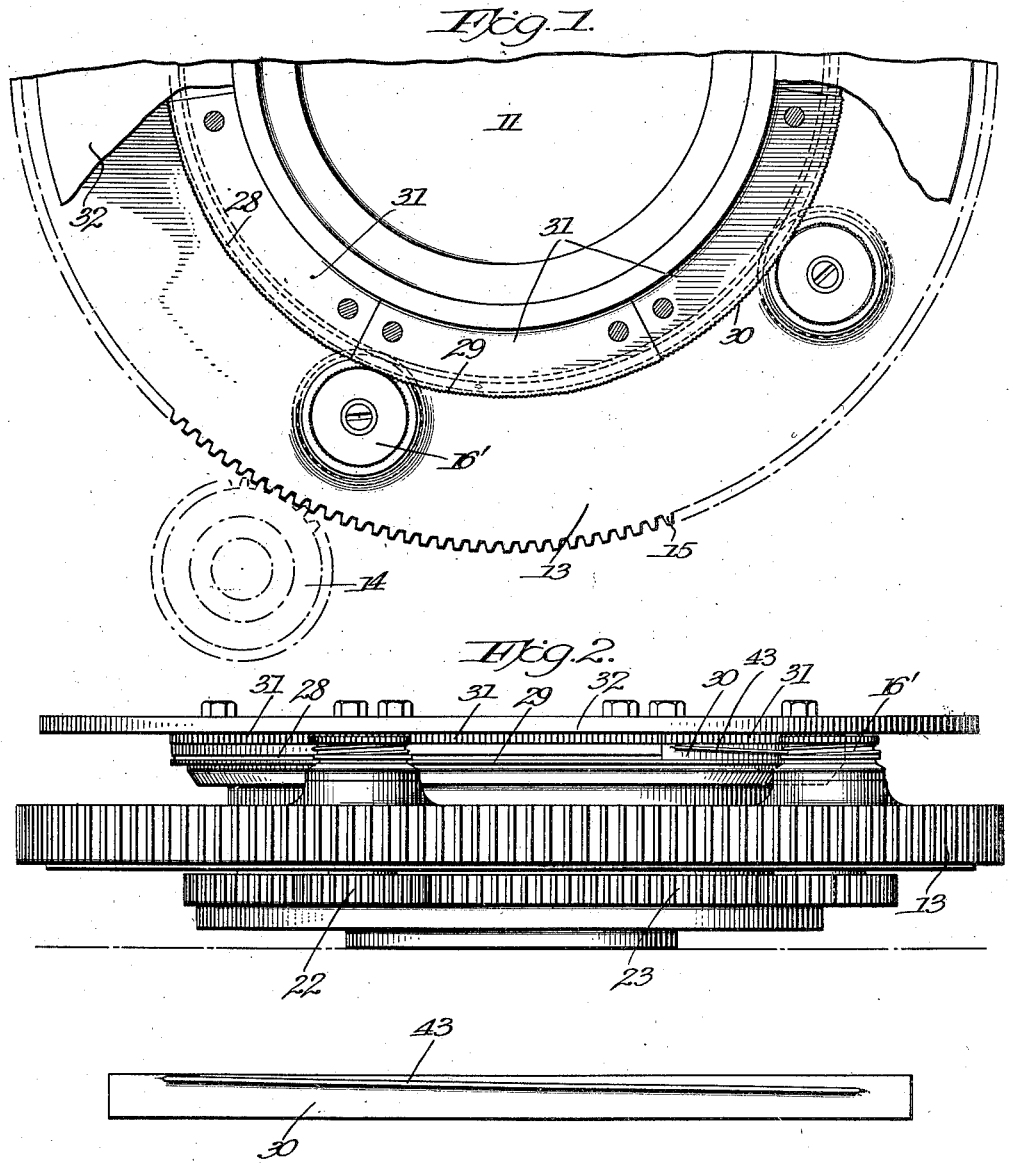
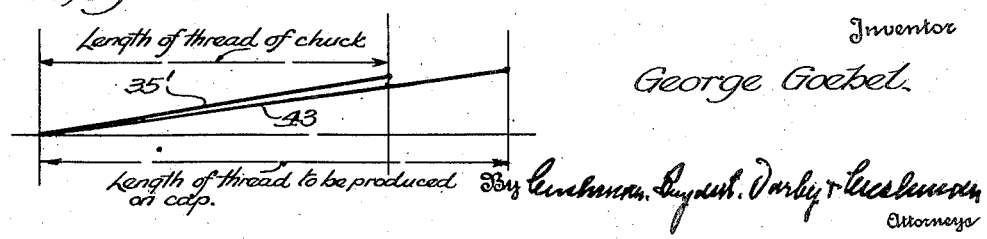
Inventor
George Goebel.

April 7, 1936.  G. GOEBEL  2,036,751
APPARATUS AND METHOD FOR FORMING CAPS
Filed Feb. 7, 1933  3 Sheets-Sheet 2
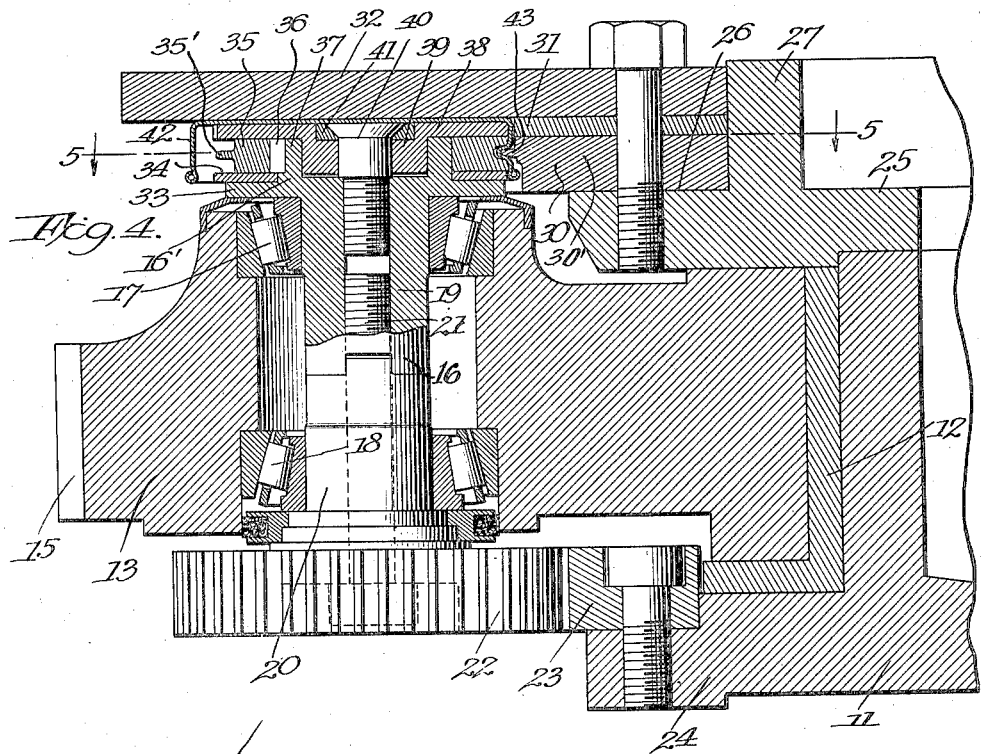
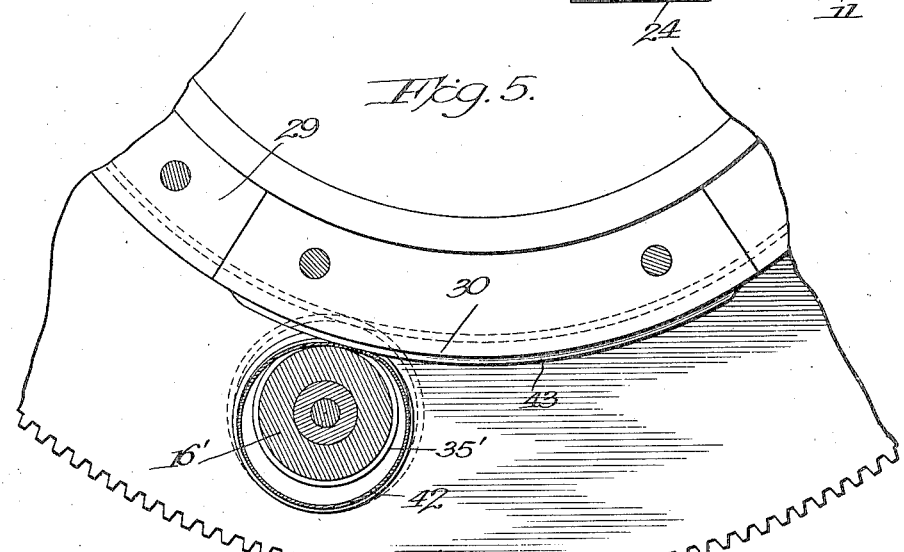
Inventor
George Goebel, April 7, 1936.  G. GOEBEL  2,036,751
APPARATUS AND METHOD FOR FORMING CAPS
Filed Feb. 7, 1933  3 Sheets-Sheet 3
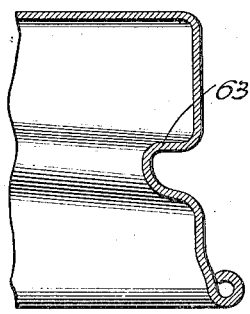
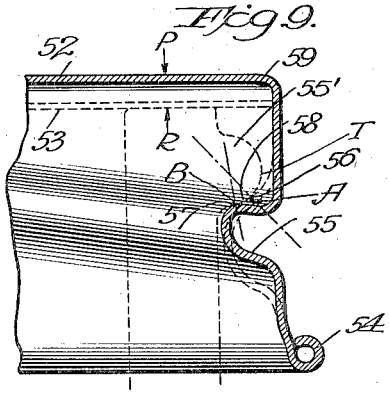
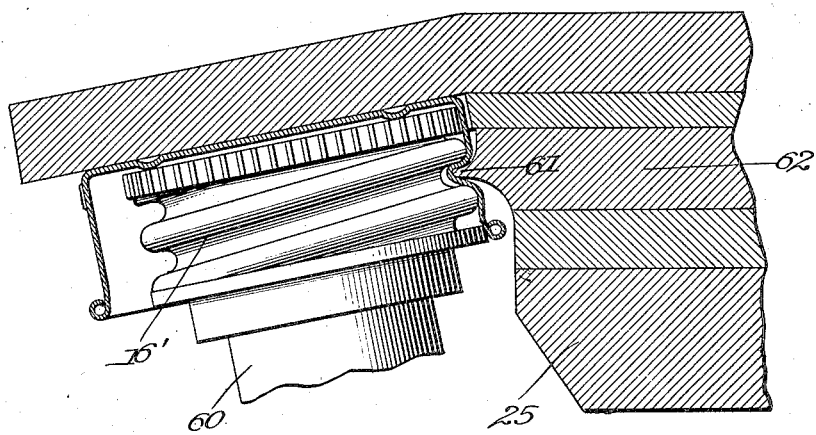
Inventor
George Goebel Patented Apr. 7, 1936

2,036,751

UNITED STATES PATENT OFFICE 2,036,751

APPARATUS AND METHOD FOR FORMING CAPS

George Goebel, Baltimore, Md., assignor to Crown Cork & Seal Company, Inc., Baltimore, Md., a corporation of New York Application February 7, 1933, Serial No. 655,668

18 Claims. (Cl. 153—2)

The present invention relates to an apparatus and method for forming caps.

More particularly, the invention relates to the type of machine in which a cap blank is given simultaneous bodily and rotational movements on a carrier or chuck fitting within the blank, as in the machine illustrated in the co-pending application of Eric B. Kramer, Serial No. 552,493, filed July 22, 1931, Patent No. 1,900,880, March 7, 1933. In threading cap blanks on a machine of this type, it is customary to support the cap blank upon a rotating die head or chuck which moves with respect to a fixed die, the two die members usually cooperating to first knurl the cap and to then form a thread upon the wall of the cap blank.

In order to permit the completed cap to be removed from the rotating internal die head or chuck after threads have been formed therein, it is necessary to have the chuck of a smaller overall diameter than the smallest internal diameter of the completed threaded cap. In other words, the cap, when threaded and completed, must not have a threaded fit upon the chuck, but must loosely rest upon the latter in order that it may be readily removed therefrom. Since the completed cap must be of relatively larger size than the chuck, the cap blank must also have a larger diameter than the chuck.

Cap threading machines have been provided in which the completed cap has a close fit upon the rotating chuck. In these machines, the completed cap must either be removed from the chuck with a straight line axial movement, causing springing of the threads, or the machine must be operated at a sufficiently slow speed to permit the caps to be removed from the chucks or die heads with a rotary unthreading movement. It is, therefore, considered better practice to have the completed cap somewhat larger, at its smallest portion, than the overall diameter of the chuck.

The necessity of having the chuck or die head which carries the cap blank of smaller diameter than the cap blank results in difficulties in providing a thread of true helix formation upon the cap blank. This difficulty particularly results from the fact that the cap blank must be given a complete rotation during its movement past the fixed die in order to provide a thread about its entire circumference and because the inner surface of the wall of the cap blank must also be acted upon over its entire circumference by the chuck or internal die, in order to cause the fixed die to act upon the entire outer circumference of the cap blank. However, since the chuck or internal die is of smaller diameter than the cap blank, the chuck must make one complete rotation and part of another rotation to act upon the entire inner surface of the larger cap blank. This naturally results in the formation in the wall of the cap blank of a thread which is not a true helix and does not exactly correspond to the true helix formed on the bottle or other container upon which the cap is used. The seal between the cap and container is, therefore, not altogether efficient unless a disc of sufficient resiliency is provided in the cap to bear against the mouth of a container when the cap is screwed on the latter.

An object of the present invention is to provide an apparatus and a method whereby a thread of true helix form will be provided on the cap blank and to provide a cap of this type.

By the apparatus and method of the invention, means is provided to insure that the cap blank and movable die or chuck will complete their respective rotations or any portion thereof at the same instant.

In the preferred embodiment of the invention, the cap blank is first knurled by the cooperation of a knurling member mounted for free rotation on the chuck and a fixed toothed knurling die along which the die head bodily moves the cap blank while the latter also rotates. Continued movement of the die head then brings it opposite a fixed threading die and a second fixed knurling or toothed element. The previously knurled portion of the cap blank and knurling member on the moving chuck will exactly mesh with the second fixed knurling element and the member and element are so arranged that the cap blank and the freely rotatable knurling member of the chuck will make one complete revolution while the chuck carrying the thread forming portion thereof is also making only one complete revolution. This will result in the formation of a true helix thread upon the cap blank.

Another object of the invention is to provide a method and apparatus of continuously and progressively forming about the cap a thread having any desired number of convolutions. Since by the method and apparatus described above, a thread of true helical form will be provided upon a cap, the thread may be continued about the cap to any desired number of convolutions.

It has heretofore been impossible to form a thread of more than one convolution about a cap blank by a machine of the type disclosed in the Kramer patent referred to above, because of the fact that the single thread formed on such a machine has not been a true helix. In other words, since the convolution formed by the machine has not been a true helix, it has naturally been altogether impracticable to carry the thread into a true second helical convolution. By the present invention, a thread of any number of convolutions may be formed on the cap, thereby greatly increasing the range of operations of a machine of the type disclosed in the Kramer patent.

Another object of the invention is to provide a screw cap, the thread of which is not only an exact helix, but which also in cross-section has a shelf provided with an upwardly projecting engaging portion or which is, in other words, of hook-shape in cross-section. The cap is, in particular, an improvement upon that disclosed in the application of Eric B. Kramer, Serial No. 552,494, filed July 22, 1931, Patent No. 1,900,881, March 7, 1933.

Many of the objections to screw caps of conventional design may be overcome by constructing a screw thread in such a way as to establish a predetermined relationship between the thread on the cap and the thread upon the container. A number of the defects in screw caps of conventional design are due to the relation of the outward wedging pressure to the sealing pressure. In the cap of the present invention, these defects are overcome by the provision of a thread upon the cap so formed in relation to the thread upon the container that the sealing pressure is substantially in excess of the outward wedging pressure.

This is accomplished by providing a cap of thin metal having a screw thread formed to a hook-shaped thread, i. e. a thread having a shelf which is generally inwardly and also upwardly inclined to make substantially a line or point contact with the thread of the container so that there is produced a downward sealing pressure substantially in excess of the outward wedging pressure. That is to say, the surface of the thread shelf and of the container thread engage well beneath the container thread and along substantially a line so that the downward sealing pressure is substantially in excess of the outward wedging pressure. Such a construction insures complete freedom from excessive outward pressure which in ordinary threaded caps causes an objectionable jamming or wedging of the threads.

In applying a conventional cap to a container, it is frequently observed that one side of the cap rises perceptibly, thereby destroying its sealing value, and it is this objection which the hook-shaped shelf characteristic of the thread of the present invention eliminates. The cap of the present invention has a relatively deep thread which engages well under the thread of the container and, in effect, actually hooks to, i. e. makes a line or point contact with the undersurface thereof; reduces to a minimum the possibility of the cap thread riding or climbing on the glass thread, and thus eliminates any such deformation as would cause the top of the cap to rise on one side or the thread to distort.

The provision of a hook-shaped thread of the type discussed above also results in a firmer contact between the inner wall of the cap and the surface of the container and also causes the cap, upon rotation with respect to the container, to be drawn down upon the mouth of a container into a much tighter engagement with the mouth of the container.

Another object of the invention is to provide a method and apparatus for forming threaded caps having a hook-shaped thread, i. e. a thread having an upwardly inclined inner shelf portion, as well as a cap of the type disclosed in the patent of Eric B. Kramer, last referred to. In either case, the threads of the caps may have any number of convolutions.

By the apparatus and method provided herein, the moving die head or chuck is so arranged with respect to the fixed die that the axis of the chuck is inclined with respect to the axis of the fixed die. This permits the shoulder of the fixed die to exert angular pressure upon the side wall of the cap blank to press the latter not only inwardly, but also upwardly with respect to a horizontal plane through the cap blank, thereby forming either a hook-shaped thread or a substantially horizontally shelved thread having an inner shelf portion disposed above the remainder of the thread.

Other objects and advantages of the invention will be apparent from the following drawings, wherein:

Figure 1 is a partial plan elevation of a machine with which my apparatus may be used, portions of the machine being broken away.

Figure 2 is a side elevation of the parts shown in Figure 1.

Figure 3 is a development of the threading die used on the machine of Figures 1 and 2.

Figure 4 is a radial cross-section of the machine of Figures 1 and 2.

Figure 5 is a horizontal sectional view taken on the line 5—5 of Figure 4.

Figure 6 is an elevation of the type of cap which may be formed with the apparatus of my invention.

Figure 7 is an elevation of a prior threaded cap.

Figure 8 is a partial vertical cross-sectional view of a threaded cap of the type disclosed in the application of Eric B. Kramer.

Figure 9 is a partial vertical cross-sectional view of the threaded cap of my invention having hook-shaped threads.

Figure 10 is a vertical radial cross-sectional view of a machine for manufacturing caps of the type shown in Figures 8 and 9.

Figure 11 is a comparative development of the threads upon the chuck and the finished cap of my invention.

Referring to Figures 1 to 5, the numeral 11 designates a stationary supporting frame which is provided with a journal bushing 12 upon which a rotating element 13 is mounted for rotary movement, the element 13 being driven by a pinion 14, the teeth of which mesh with teeth 15 on the outer periphery of the element 13. A plurality of mandrels 16 are circumferentially spaced about the element 13, the mandrels being mounted for rotation in the element upon upper and lower roller bearings 17 and 18. This construction is generally old and is disclosed in the co-pending application of Eric B. Kramer, Serial No. 552,493, filed July 22, 1931, Patent No. 1,900,880.

As shown in Figure 4, the mandrels 16 are formed of upper and lower sections 19 and 20, respectively, the two sections being held together by a bolt 21. The lower section 20 is provided with a pinion 22 which meshes with a stationary sun gear 23 fixed to the lower projecting flange 24 of the supporting frame 11.

A ring or plate 25 is fixed to the supporting frame 11 above the rotating element 13, which plate is provided with a shoulder 26 and an upstanding flange 27. Stationary dies are supported upon the shoulder 26 to cooperate with bodily and rotatably movable chucks or die heads 16' carried by the mandrels 16 to form a threaded cap or closure. As is shown in Figures 1 and 2, the stationary dies preferably comprise a first wiring die 28, a second wiring die 29 and a threading die 30 having a single threading track 43 thereon as shown in Figure 3. In the present instance, this track is of a length corresponding to the circumference of the cap blank, i. e. of just sufficient length to form an exact helix in one revolution of the blank. These chucks include knurling die members positioned above and upon the three die sections referred to which perform the respective wiring steps and the threading, the knurling members being held to the lower die sections and to the shoulder 26 of plate 25 by bolts extending through a hold-down plate 32 positioned upon the knurling dies 31 and extending out over the path of travel of the mandrels 16.

The die heads or chucks 16' at the upper ends of the mandrels 16 include a circumferential flange 33 upon which is secured a wiring die ring or member 34, which is adapted to cooperate with the stationary wiring dies 28 and 29 to wire the lower edge of a cap blank. A circular threading die member 35 having a threading shoulder 35' rests upon the wiring die ring 34, the die 35 being keyed, as shown at 36, to an upstanding annular flange 37 upon the mandrel section 19. A knurling die disc 38 rests upon the threading die ring 35, a central boss 39 projecting downwardly from the disc 38 being seated within the space defined by the annular flange 37 on the upper mandrel section 19. A machine screw 40 extends through a central aperture in the boss 39 and is threaded into the central bore in the upper mandrel section 19. In order to permit the knurling disc 38 to rotate freely with respect to the mandrel and the die sections fixed thereto, the machine screw 40 is unthreaded at its upper portion and a washer 41 surrounds the head of the screw.

Figure 11 is a development showing the respective lengths of the thread shoulder 35' on the threading die ring 35 of chuck 16' and the thread to be formed on the cap blank, which latter, of course, also corresponds to the length of the thread track 43 on the fixed die 30, and is so designated. The thread 43, since it is equal to the circumference of the cap blank, is longer and is less sharply pitched than the thread 35' on the smaller diametered die ring 35.

The operation of my apparatus is as follows: Cap blanks 42 are supplied to the die head 16' by any suitable mechanism, and the revolution of the ring-like element 13 bodily moves the mandrels and the die heads or chucks included thereon beneath the hold-down plate 32. The circumferential or bodily movement of the mandrels 16 with respect to the sun-gear 23 will cause the mandrels to rotate. Referring to Figure 1, the mandrels move from left to right and the cap blanks carried thereby first move into engagement with the first wiring die 28 and the knurling die member 31 included in this die. The knurling disc 38 carried by the mandrel will cooperate with the stationary knurling die to knurl the upper portion of the cap blank 42. At the same time, the wiring die element 34 carried by the mandrel will coact with the first fixed wiring die 28 to bend the lower edge of the cap blank upwardly as the first step toward wiring the blank, this being accomplished in the usual manner. Continued movement of the mandrel 16 will bring the cap blank 42 into contact with the second wiring die 29 and the stationary knurling die section included in the latter. The wiring element 34 will cooperate with the second stationary wiring element 29 to complete the wiring of the cap blank. During this movement of the cap blank past the second wiring section 29, the knurling disc 38 will, through the knurled portion of the cap blank 42, mesh with the knurled section 31, which is fixed above the second wiring die 29.

As the mandrel moves the cap blank into contact with the threading die 30, the normal tendency of the cap blank would be to rotate at the same speed as the mandrel 16. However, the stationary knurling section 31, which is positioned above the threading die section 30, will mesh with the knurled upper portion of the cap blank 42 and the inner surface of this knurled portion of the cap blank will mesh with the knurled disc 38 of the die head. The result of this action will be that the cap blank will rotate at a speed determined by the intermeshing of the fixed knurling die and the knurled disc 38, which latter is freely rotatable with respect to the remainder of the die-head. The free or loose positioning of the knurling disc 38 upon the die head 16' will permit disc 38 to rotate at a faster rate of speed than the mandrel and the threading element 35.

As is clearly shown in Figure 4, the pitch diameter of the mandrel pinion 22 is greater than the pitch diameter of the threading die member 35, which is keyed to the mandrel and is practically identical to the diameter of the thread to be formed on cap blank 42 and the pitch of the knurling on the knurling disc 38. The revolving threading die member will, therefore, have a lower peripheral speed than the cap blank and will make but one rotation while the knurling disc 38 and cap blank also make but one rotation. This will result in the occurrence of a slip or lag between the threading die member 35 of the die head and the cap blank 42. A thread of true helix formation will therefore be formed on the cap blank as shown in Figure 6, the thread being, in effect, ironed into the cap wall by the lagging action of the member 35 referred to above.

A cap produced with this apparatus has a thread which is a true spiral or helix due to the fact that the thread is produced by causing the cap and chuck to complete their individual revolutions or rotations simultaneously, i. e. only one revolution of the chuck or internal die head occurs while the cap blank also makes one revolution. This is accomplished by causing the blank to slip relative to the internal threading die of smaller diameter, effected through the engagement of the blank with the knurling segment above the threading segment and resulting in one revolution of the blank while the chuck is making but one revolution. This is further permitted because of free rotation of the knurling disc 38 on the mandrel.

A comparison of the cap of Figure 7, formed in the manner disclosed in the co-pending Kramer application Serial No. 552,493, Patent No. 1,900,881 and the cap of my invention, shown in Figure 6, will make obvious the differences between the threading of my cap and caps of previous types. In the cap of Figure 7, the ends of the thread necessarily overlap, for the reasons stated above. In my cap, shown in Figure 6, the thread is a true helix and, as has been described above, need have but one convolution about the cap.

My form of cap having a hook-shaped thread is illustrated in Figure 9 and is indicated by the numeral 52. The cap 52 is preferably formed of sheet metal and fashioned from a blank by apparatus illustrated in Figure 10. It will be understood that the cap 52 may be formed in accordance with the method and apparatus described in connection with Figures 1 to 5 modified in accordance with the showing of Figure 10 in a manner hereinafter described.

The cap of the present invention is adapted for use with threaded containers in accordance with accepted standards, and particularly with threads which are in general contour curved in cross-section and adopted as standard by the Glass Container Association of America.

The cap is usually provided with a liner 53 of resilient material such as paper, rubber, paper pulp or cork and the cap is provided with the customary wired edge 54.

It will be observed that the thread 55 in the skirt of the cap presents in cross-section substantially the contour of the conventional fish-hook, and the shelf 56 of the thread is generally inwardly and upwardly inclined and by reason of the depth thereof will hook under the glass thread to facilitate the attainment of the high sealing pressure possible with this invention.

Figure 9 includes a dotted line showing of a screw cap of conventional design wherein the thread contacts with the glass thread 55' of the container at A. This area of contact may vary a little, either up or down on the glass, depending upon the nicety with which the glass thread is made and in accordance with the glass diameters, that is, whether such diameters are to be maximum or minimum specifications of the standard finishes. It will be noted, however, that the area of contact is relatively close to a diametrical point T on the surface of the glass thread when the diameter is drawn substantially parallel to either the top or bottom of the container. The objection to such an area of engagement will be subsequently brought out, but it can here be stated that the outward wedging pressure or the pressure which is exerted on the cap thread tending to cause it to ride or climb over the glass thread is excessive at the point A, which not only causes the distortion of the cap but very seriously interferes with and reduces the sealing value, by causing one side of the cap to rise up perceptibly.

The thread 55 of the cap of the present invention, on the other hand, engages the glass thread at B, a point relatively close to the wall of the container and quite remote from the diametrical point T. It will be observed that the contact portion of the shelf engages the undersurface of the container thread to establish a line contact and that the opposed contact portions, i. e. surfaces of the cap thread and container thread at said line of contact approach sufficiently close to perpendicularity to the axis of the cap and the container to insure downward sealing pressure in excess of the outward wedging pressure. In this manner the outward wedging force is extremely small and the sealing value is correspondingly augmented.

The radially inner end of the shelf 56 is indicated by the numeral 57, the shelf being upturned or upwardly and inwardly inclined or even arcuate, i. e. concaved, to this point and convex or upwardly projecting at 57. The undersurface of the glass or container thread is indicated by the numeral 58 and it will be noted from Figure 9 that the point of contact B between the shelf 56 and the undersurface 58 of the container thread is at 57 and is at a point sufficiently beneath the container thread to provide a frictional sealing contact characterized by a pressure exerted by the cap on the container in excess of the outward wedging pressure.

It will be understood that when the cap is turned, the turning effort applied to the cap results in a downward pressure which will be denoted as P but which is resisted by an equal pressure R in the glass. It is quite evident that this resistance is transferred to the glass thread in the conventional construction at the point A. With the present invention this resistance is transferred to the point B.

A full explanation of the theory and advantages of a cap formed with a thread adapted to contact with the thread of the container at the point B is set forth in the application of Eric E. Kramer, Serial No. 552,494, filed July 22, 1931, Patent No. 1,900,881, March 7, 1933, a cap of the Kramer type being shown in Figure 8. The present cap operates in the same manner as the Kramer cap but the shelf 56 of the thread 55 of my cap being upwardly and inwardly inclined provides an even better seal than that of the Kramer cap illustrated in Figure 8 because it provides maximum sealing pressure and minimum wedging pressure.

Because of the fact that the point of engagement of the threads is at a single line or point, there is a clearance between the cap body and container neck, thereby permitting easy application and removal of the cap.

It will be understood that also by reason of the line or point engagement between the threads, the top of the cap cannot rise but is drawn downwardly, exerting a high sealing pressure. Heretofore, reliance has been placed on the cushion or liner 53 to provide a maximum sealing contact despite irregularities which may occur in the sealing surface of the container. The hooking engagement of the threads 55 actually compels the rim or outer portion 59 of the top of the cap to be flexed downwardly, possibly due to the resiliency of the metal and also by reason of the clearance between the cap body and container neck, these portions being substantially out of contact between the point or line contact B or 57 on the threads 55 and the sealing surface on the top edge of the bottle mouth, as shown in Figure 9. The deformation caused by the flexing does not impair the cap, but rather equalizes the resilience or tension of the metal throughout the rim portion 59 so that the cap may be used over and over.

Figure 10 illustrates a modification of the machine of Figures 1 to 5 intended for the formation of the cap shown in Figure 9 and which may also be applied to numerous other types of cap threading machines.

In a machine constructed in accordance with Figure 10, the mandrel 60 is inwardly and downwardly inclined with respect to the axis of the supporting plate and the sun-gear which is carried by the latter in the usual manner. By this arrangement, a substantially horizontal threading shoulder or track 61 on the fixed threading die 62 will form a substantially horizontal shelf 63 in the thread of a cap, as shown in Figure 8. If the axis of the mandrel 60 is inclined at a greater angle with respect to the axis of the machine, or if the configuration of the cooperating threading dies on the chuck or die head 16' are varied in vertical section, an upturned shelf 56 will be formed on the upper surface of the thread of the cap, as shown in Figure 9.

In other words, the apparatus of Figure 10 is so designed that the faces of the dies are non-parallel, permitting one die to act angularly with respect to the other. That is to say, the base planes of the dies are non-parallel or at an angle to each other, i. e., the plane passing horizontally or longitudinally through the fixed die 62 is at an angle to the plane which intersects the axis of the die head 16' at a right angle to such axis.

It will be obvious to one skilled in the art that in order to permit the mandrel 60 to operate at an angle with respect to the axis of the machine, it is only necessary to provide a beveled gear at the lower end of the mandrel instead of the pinion 22, shown in the Figures 1 to 5 form of the apparatus, the beveled gear meshing with a suitably formed sun gear on the base or supporting plate of the machine.

By the methods and apparatuses disclosed above, any one of the caps which have been described herein may be formed with a true helix thread having more than one convolution about the cap. In order to form a thread of this type with the apparatus and by the method disclosed in Figures 1 to 5, it is only necessary to lengthen the thread track 43 of the threading die 30, and to increase the vertical depth of the die 30 so that the thread track 43 may continue downwardly thereon at the same angle shown in Figure 3. In order to form a thread of more than one convolution about a cap blank with the apparatus and by the method referred to in connection with Figures 8 to 10, the same procedure would be followed with the thread track 61 and the fixed threading die 62 of these figures. In either event, the movement of the rotating die or chuck with respect to the fixed die would cause a thread of the desired number of convolutions to be formed on the cap blank, the length of the path of travel of the chuck being increased so that it will move a sufficient distance to have the desired number of convolutions formed on the cap.

It is then obvious that my improvement upon a machine of the type disclosed in Kramer application Serial No. 552,493, Patent No. 1,900,880 whereby true helix threads may be formed upon caps with such a machine, greatly increases the range of operations of the machine, in that caps having true helical threads of any desired number of convolutions may be formed on such a machine by the use of my invention.

It will be understood that the invention is not limited to the details of construction of the apparatuses and caps shown in the drawings, and that the examples of the use of the caps, apparatuses and methods which have been given do not include all of the uses of which they are capable or by which the method may be followed; also, that the phraseology employed in the specification is for the purpose of description and not of limitation.

I claim:

1. An apparatus of the class described comprising a stationary cap blank threading die, a rotating threading die to support a cap blank and move the same longitudinally of the stationary die, and cooperating means on the stationary die and said rotating die constructed and arranged to rotate the cap blank more rapidly than the rotating die during movement with respect to the stationary die.

2. An apparatus of the class described comprising a stationary die, a rotating die element, means to move the rotating die element longitudinally of the stationary die, a cap blank supporting member freely rotatable upon the rotating die element, and cooperating means on the stationary die and the supporting member constructed and arranged to rotate the cap blank more rapidly than the rotating die element during longitudinal movement with respect to the stationary die.

3. An apparatus of the class described comprising a stationary die, a rotating die member to support a cap blank and move the same in contact with the stationary die to thread the blank, and means on the stationary die constructed and arranged to rotate the blank more rapidly than the rotating die during movement with respect to the stationary die.

4. An apparatus of the class described comprising a stationary die, a rotating die member to support a cap blank and move the same in contact with the stationary die to thread the blank, and means on the rotating die constructed and arranged to rotate the blank more rapidly than the rotating die during movement with respect to the stationary die.

5. An apparatus of the class described comprising a stationary die, a rotating die, means to move the rotating die with respect to the stationary die, a member for supporting a cap blank of larger diameter than the rotating die, said cap blank supporting member being freely rotatable upon the rotating die element, and cooperating means on the stationary die and the supporting member to cause the cap blank and the rotating die element to complete their respective rotating movements in the same period of time.

6. An apparatus of the class described comprising a stationary element including a die, a movable element, a rotatable die carried by the movable element and adapted to support a cap blank, means to move the movable element and rotatable die with respect to the stationary element and die and to rotate the rotatable die during such movement, and cooperating means on the stationary die and rotatable die constructed and arranged to rotate the cap blank more rapidly than the rotatable die during movement with respect to the stationary die.

7. An apparatus of the class described comprising a stationary element including a die, a movable element, a rotatable die carried by the movable element and adapted to support a cap blank, means to move the movable element and rotatable die with respect to the stationary element and die and to rotate the rotatable die during such movement, and cooperating means on the stationary die and rotatable die constructed and arranged to rotate the cap blank more rapidly than the rotatable die during movement with respect to the stationary die.

8. An apparatus of the class described comprising a stationary member having a threading die and a gear rack fixed thereto, a movable member, a movable threading die adapted to coact with the stationary die and including a gear rotatably mounted on said movable member, said gear being of larger diameter than said movable die, means to move said movable member with respect to the stationary member, said gear meshing with said gear rack during such movement to cause the movable die to rotate, a cap blank supporting member rotatably mounted upon the movable die and cooperating means on said member and the stationary die to cause the blank to rotate with respect to said movable die and the difference in the respective diameters of said gear and movable die causing said die to lag with respect to the rotary movement of the blank during movement with respect to the stationary die.

9. An apparatus of the class described comprising a fixed element, a forming die carried by the element and extending in a predetermined longitudinal plane, a blank carrier positioned for movement with respect to said element, the axis of the carrier being inclined with respect to the longitudinal plane of the forming die, and means to move the carrier with respect to the element.

10. An apparatus of the class described comprising a stationary die, a rotating die, means to move the rotating die with respect to the stationary die, a knurling member for supporting a cap blank of larger diameter than the rotating die, said knurling member being freely rotatable upon the rotating die element, and cooperating means on the stationary die and the knurling member arranged to rotate the cap blank and the rotating die element to cause them to complete their respective rotating movements in the same period of time.

11. An apparatus of the class described comprising a stationary cap blank threading die, a rotating threading die to support a cap blank and move the same longitudinally of the stationary die, and cooperating means on the stationary die and said rotating die arranged to rotate the cap blank coincidentally with but at a different speed from the rotating die during movement with respect to the stationary die.

12. An apparatus of the class described comprising a stationary die, a rotating die element, means to move the rotating die element longitudinally of the stationary die, a cap blank supporting member freely rotatable upon the rotating die element, and cooperating means on the stationary die and the supporting member arranged to rotate the cap blank coincidentally with but at a different speed from the rotating die element during longitudinal movement with respect to the stationary die.

13. A method of threading cap blanks comprising positioning the cap blank upon a rotatable die, moving it in contact with a stationary die and causing the cap blank to rotate more rapidly than the rotatable die during its movement with respect to the stationary die.

14. A method of threading cap blanks comprising positioning the cap blank upon a rotatable die of less diameter than the smallest diameter of the blank when the threading is completed, moving the blank in contact with a stationary die, and causing the cap blank and the rotatable die to each complete a single revolution simultaneously.

15. The method of making from a cupped blank a screw cap having a skirt formed with a continuous thread which comprises positioning the cupped blank upon a rotatable die of less diameter than the smallest diameter of the blank when the threading is completed, moving the blank in contact with a stationary die and causing the cap blank and the rotatable die to each complete a single revolution simultaneously.

16. An apparatus for threading cap blanks comprising a stationary die, a rotatable and bodily movable die member to support a cap blank, said rotatable die member being of less diameter than the smallest diameter of the blanks when threaded and being constructed and arranged to move the blank bodily past the stationary die, and cooperating means on the two dies arranged to rotate the cap blank at such speed that the latter will complete a rotation simultaneously with the rotating die member.

17. An apparatus of the class described comprising a fixed element, including in arcuate face, a forming die carried upon said face of said element, a blank carrier positioned for movement along said face of the fixed element, the axis of said carrier being positioned in a plane radial with respect to said element and inclined with respect to the axis of said element in said plane, and means to move the carrier with respect to said element.

18. The method of forming a hook-shaped thread upon a cap blank, comprising positioning the blank upon a rotatable threaded die, moving the die in contact with a stationary threaded die, maintaining the axes of the two dies inclined relatively to each other in a plane common to the axes of both dies, and thereby forming a hook-shaped thread upon the cap blank.

GEORGE GOEBEL.